United States Patent
Dahlen et al.

(10) Patent No.: US 9,198,124 B2
(45) Date of Patent: Nov. 24, 2015

(54) NETWORK SELECTION IN A SHARED NETWORK ENVIRONMENT

(71) Applicant: TeliaSonera Ab, Stockholm (SE)

(72) Inventors: Anders Dahlen, Vasterhaninge (SE); Ulf Nilsson, Vasterhaninge (SE)

(73) Assignee: TELIASONERA AB, Stockholm (SE)

( * ) Notice: Subject to any disclaimer, the term of this patent is extended or adjusted under 35 U.S.C. 154(b) by 168 days.

(21) Appl. No.: 13/855,849

(22) Filed: Apr. 3, 2013

(65) Prior Publication Data

US 2013/0265954 A1 Oct. 10, 2013

(30) Foreign Application Priority Data

Apr. 5, 2012 (EP) .................................... 12163276

(51) Int. Cl.
- *H04W 4/00* (2009.01)
- *H04W 48/18* (2009.01)
- *H04W 48/14* (2009.01)
- *H04W 8/22* (2009.01)

(52) U.S. Cl.
CPC .............. *H04W 48/18* (2013.01); *H04W 48/14* (2013.01); *H04W 8/22* (2013.01)

(58) Field of Classification Search
None
See application file for complete search history.

(56) References Cited

U.S. PATENT DOCUMENTS

| | | | |
|---|---|---|---|
| 2006/0073831 A1* | 4/2006 | Guyot et al. | 455/443 |
| 2009/0213834 A1* | 8/2009 | Amirijoo et al. | 370/352 |
| 2010/0220680 A1* | 9/2010 | Ramankutty et al. | 370/329 |
| 2010/0323695 A1* | 12/2010 | Kallio et al. | 455/435.2 |
| 2011/0080894 A1* | 4/2011 | Iwamura et al. | 370/331 |
| 2011/0201342 A1* | 8/2011 | Wong et al. | 455/450 |
| 2011/0230188 A1 | 9/2011 | Gemski | |
| 2013/0235785 A1* | 9/2013 | Sebire et al. | 370/312 |

FOREIGN PATENT DOCUMENTS

WO 2005/109936 11/2005

OTHER PUBLICATIONS

European Search Report dated Sep. 5, 2012, corresponding to the Foreign Priority Application No. EP 12 16 3276.
3rd Generation Partnership Project; Technical Specification Group Core Network and Terminals; Mobile radio interface Layer 3 specification; core network protocols; Stage 3 (Release 11), 3GPP Draft; Draft 24008-B20, 3rd Generation Partnership Project (3GPP), Mobile Competence Centre; pp. 93-98, 104-105, 134-135, 164-165, 396-403; Mar. 6, 2012; XP002682851.

(Continued)

*Primary Examiner* — Edan Orgad
*Assistant Examiner* — Rebecca Song
(74) *Attorney, Agent, or Firm* — Young & Thompson (57) ABSTRACT

A method for performing a selection of a public land mobile network identity in a shared network environment, in which environment at least two public land mobile network identities are available for providing circuit switched based service to user equipment. The method includes at least a step of deter-mining a capability of the user equipment and a step of selecting the public land mobile network identity at least partly on the basis of the capability of the user equipment among the at least two public land mobile network identities. Information on the capability of the user equipment is either received from the user equipment or from a database including capability information on the user equipment. Furthermore, a network element and a system for implementing at least partly the method are described.

16 Claims, 3 Drawing Sheets

(56) References Cited

OTHER PUBLICATIONS

3rd Generation Partnership Project; Technical Specification Group Services and System Aspects; Circuit Switched (CS) fallback in Evolved Packet System (EPS); Stage 2 (Release 11); 3GPP Standard; 3GPP TS 23.272, 3RD Generation Partnership Project (3GPP), Mobile Competence Centre; vol. SA WG2, No. V11.0.0; Mar. 8, 2012; pp. 1-87; XP050555343.

3rd Generation Partnership Project; Technical Specification Group Services and System Aspects; Network Sharing; Architecture and Functional Description (Release 11); 3GPP Standard; 3GPP TS 23.251, 3RD Generation Partnership Project (3GPP), Mobile Competence Centre; vol. SA WG2, No. V11.1.0; Mar. 8, 2012, pp. 1-28; XP050555340.

* cited by examiner

Fig. 1

(Related Art)

NETWORK SELECTION IN A SHARED NETWORK ENVIRONMENT

TECHNICAL FIELD

The invention concerns in general the technical field of selection of a network in a shared network environment. Especially the invention concerns the selection of a PLMN-id for a circuit switch fallback.

BACKGROUND OF THE INVENTION

The evolution of wireless communications has resulted in an increase of networks of different technologies and corresponding different air interfaces within an area. As a result, during the course of a single call, a wireless user equipment (UE) may roam among multiple radio access networks (RANs), wherein each such RAN implements a different technology to the other RANs of the multiple RANs, for example, a second generation (2G) and a third generation (3G) circuit switched RAN, such as a GSM (Global System for Mobile communications) network and WCDMA (Wideband Code Division Multiple Access) providing primarily circuit voice service, and a packet data RAN, such as a later generation 3GPP LTE (Third Generation Partnership Project Long Term Evolution) network. As the UE roams among the circuit switched RAN and the packet data RAN providing packet data services, it may be beneficial to system performance to handover the UE between the circuit switched RAN and the packet data RAN for example due to fact that channel conditions associated with the latter RAN may be more favorable than the channel conditions associated with the former RAN. By way of some other examples, an operator of both a legacy circuit network and a packet data network may desire to move the UE from one such network to the other network for purposes of system load balancing and/or for providing certain services to the UE, which cannot be offered in the network into which the UE is presently connected.

Another aspect, in addition to different network technologies within an area, is the management of networks by telecom operators. In a single area there can be one or more networks with different technologies operated by one or more telecom operators. One can directly see that such an environment increases the complexity of a network selection by the user equipment (UE), but it is also inefficient from operators' point of view due to high investment costs of a network or part of it. In order to improve the efficiency the operators may have agreed on sharing at least part of their networks, e.g. in a situation when a network is owned by some companies in a joint ownership basis. As a result, operators may establish an own network for certain areas, but co-utilize a network in some other areas in order to provide extensive communication services to the subscribers.

There exist different models for the network sharing. Mainly, the models relate to the extent of sharing the network and/or part of it. In principle, it is possible to share any part of the network, but basically one can talk about sharing a core network, radio network or both of them. The sharing shall also be understood as covering a share of at least one network element and/or radio resources. More specifically, a network sharing architecture shall, according to at least 3GPP Specification TS 23.251 V11.0.0 (2011-09), allow different core network operators to connect to a shared radio access network. The operators do not only share the radio network elements, but they may also share the radio resources. In addition to this shared radio access network the operators may or may not have additional dedicated radio access networks, like for example, 2G radio access networks. There are two identified architectures to be supported by network sharing in WCDMA. In both of these architectures the radio access network is shared. In addition to that the first architecture, also known as a Gateway Core Network (GWCN) configuration, introduces a solution in which also parts of the core network, such as Mobile Switching Centres (MSC) and Serving GPRS Support Nodes (SGSN), are also shared among different operators. The other network architecture supported by network sharing is the one in which only the radio access network (RAN) is shared and core network nodes operated by different operators are connected to the same Radio Network Controller (RNC). This architecture is known as a Multi-Operator Core Network (MOCN).

The principles of the above described architectures are also applicable to other network technologies than WCDMA. For the Evolved Packet System (EPS) on the packet switched (PS) domain of the architectures is relevant only. For EPS the both above described architectures apply, but the Mobility Management Entity (MME) replaces the SGSN, the eNode B replaces the RNC and the S1 reference point replaces the Iu interface between the core network (CN) and UTRAN. For GERAN access only the latter of the architectures (MOCN) described above applies. The RNC is replaced with Base Station Controller (BSC) and Iu interface is replaced with A/Gb interface.

An example of a shared network model of MOCN type can be such an architecture in which two core network operators share an UTRAN. However, both operators have their own E-UTRAN and GERAN networks i.e. they are not shared. Thus, the operators share UTRAN RNC and other radio network elements, such as base stations, within an area. It is clear that multiple other network sharing architectures may be configured accordingly.

Next, the network sharing is considered from UE point of view. In order to utilize shared networks the UE must be capable of it. In practice this means that the UE must be able to receive and utilize the additional broadcast system information concerning available core network operators in the shared network. The term 'core network operator' shall be understood as an operator that provides services to subscribers as one of multiple serving operators that share at least a radio access network. Each core network operator may provide services to a subscriber of other operators by national or international roaming. Based on the capability of utilizing the additional broadcast system information user equipments can be categorized into two groups. First group are such UEs, which support network sharing in the sense that they are able to select a core network (CN) operator as the serving operator within a shared network on the basis of the additional broadcast system information. Such UEs are called in this context supporting UEs. Correspondingly, second group of UEs i.e. non-supporting UEs do not support network sharing in the sense that they ignore the additional broadcast system information that is specific for network sharing. Worthwhile to mention is that no information concerning the configuration of a shared network is indicated to the non-supporting UE.

Each cell in shared radio access network shall include information concerning available core network operators in a shared network into the broadcast system information. The available core network operators shall be the same for all cells of a Location Area in a shared UTRAN or GERAN network and the core network operators are identified by a PLMN-id, which consists of a Mobile Country Code (MCC) and a two to three digit Mobile Network Code (MNC). Furthermore, each location area of a public land mobile network (PLMN) has its own unique identifier which is known as Location Area Identity (LAI). This internationally unique identifier is used for location updating of mobile subscribers. It is composed of a three decimal digit Mobile Country Code (MCC), a two to three digit Mobile Network Code (MNC) that identifies the PLMN in that country, and a Location Area Code (LAC). Similarly, the available core network operators shall be the same for all cells of a Tracking Area in a shared E-UTRAN network. Each tracking area of a PLMN has its own unique identifier which is known as Tracking Area identity (TAI). The Tracking Area Identity is constructed from the MCC (Mobile Country Code), MNC (Mobile Network Code) and TAC (Tracking Area Code).

When a UE performs an initial access to a shared network, one of available CN operators shall be selected to serve the UE. The selection is dependent on the type of the UE described above. A supporting UE decodes the broadcast system information to determine available core network operators in the shared network and cell (re-)selection procedures. The UE regards both the core network operators indicated in the broadcast system information and conventional networks as individual networks. By the term 'conventional network' it is meant a PLMN consisting of radio access network and core network, by which only one serving operator provides services to its subscriber, and subscribers of other operators may receive services by national or international roaming. The core network operators together with all conventional networks are candidate PLMNs in the PLMN-id selection procedure that is performed by the supporting UE. The selection of a core network operator by the UE shall be respected by the network. Supporting UEs inform the radio resource controlling element, such as RNC or eNode B, of the network identity of the chosen core network operator from a list of PLMNs in the broadcast system information. In a UTRAN GWCN configuration, the RNC relays the chosen network identity to the shared core network node. In a MOCN configuration, the RAN routes the UE's initial access to one of the available CN nodes in the shared network. Thus, the supporting UEs inform the RAN of the chosen core network operator, which the RAN uses in order to route correctly.

A non-supporting UE, in its turn, ignores the broadcast system information that is relevant for network sharing. Thus, only the common PLMN together with all conventional networks are candidate PLMNs for the PLMN-id selection procedure that shall be performed by the UE. For indicating a common PLMN i.e. the serving operator for the non-supporting UE a broadcast "common PLMN-id" is used in the PLMN (re)selection processes in UTRAN by the UE. In other words, the common PLMN is a PLMN-id indicated in the system broadcast information as defined for conventional networks (non-shared networks). The non-supporting UEs consider the Common PLMN and the location area code as the Location Area Identity (LAI) and the common PLMN and the location and routing area code as the Routing Area Identity (RAI). The common PLMN does not point out one particular CN operator but any of the CN operators may be able to serve a non-supporting UE. Thus, the RAN, when serving a UE, initially tries to take the UE under control of one CN operator. However, in this initial CN routing phase the RAN has very little information about the subscriber (for example lacks information about the customers IMSI) and for that reason the initial routing phase may not work out. If the routing phase is not successful, a redirection to another CN operator may be required for non-supporting UEs until such an operator is found that can serve the UE. In particularly, for non-supporting UEs of subscribers belonging to one of the CN operators it is not likely to have a roaming agreement with the other CN operators in the shared network, since each CN operator is willing to serve its own subscribers. A special case of non-supporting UEs are inbound roamers with non-supporting UEs, whose home operator has roaming agreement with more than one CN operator in a shared network. Such subscribers may always be redirected to one of the CN operators (e.g. based on International Mobile Subscriber Identity (IMSI) analysis), but it can also be redirected to different operator depending on the geographical area or old Temporary Mobile Subscriber Identity (TMSI), for example.

Moreover, a supporting UE shall use the PLMN-ids that are broadcast in the Multiple PLMN ID List information element. The Common PLMN may or may not be part of the Multiple PLMN ID List. If the common PLMN is part of the multiple PLMN ID list, the common PLMN indicates one of the CN operators for the supporting UEs and no redirection applies. The supporting UEs select one of the Multiple PLMNs and consider the selected PLMN and the location area code as the location Area Identity (LAI) and the selected PLMN and the location and routing area code as the Routing Area Identity (RAI). Thus, in a shared network UEs using the same cell use different location and routing area identities because PLMN identity is different (but location area code is same for all) due to the fact that different CN operators have their own identifier in PLMN-id, and thus in LAI as described above. If the LAI of a cell is not the same as the registered LAI the UEs performs location update, and if RAI of a cell is not the same as the registered RAI the UEs performs routing update.

In order to introduce the problem in a shared network architecture we need to describe a novel feature in EPS network i.e. LTE network. The EPS network consists of Evolved Packet Core (EPC) and Evolved Universal Terrestrial Radio Access Network (E-UTRAN).

EPS does not currently have any Circuit Switched (CS) domain due to the fact that EPS technology is based on Packet Switched (PS) domain. However, there exist some services, especially at the beginning of EPS deployment that needs to be provided based on CS technology. Such services are e.g. voice calls and short message service (SMS) among others. Yet, a UE capable of EPS cannot utilize e.g. the UTRAN simultaneously while camping in LTE and, as a result, there are no means of originating or terminating any voice calls from e.g. WCDMA CS domain. In order to provide necessary CS based services to subscribers it was decided on a mechanism to support such needs. The mechanism is called Circuit Switched Fallback (CSFB) function, which enables e.g. voice services by using existing WCDMA CS domain functions to be provided to subscribers in EPS.

The CSFB means that the UE is directed from EPS to GERAN (2G) or UTRAN (3G) for voice service. At mobile terminating call a circuit switched call arrives at the MSC Server, the MSC Server sends a page request over the SGs interface to the MME in E-UTRAN. MME starts the paging of the UE in E-UTRAN with the information element CN domain indicator set to CS (Circuit Switch) in the paging message for indicating that the CS network originated the paging. The eNode Bs to be paged are determined from the MME list of TAIs for the UE or from the location information sent in the MSC paging message. When the UE is found i.e. the UE responds with an Extended Service Request for mobile terminating CS fallback to MME, the MME instructs the eNode B to perform CSFB for the UE by sending CSFB indicator in an Initial UE Context Setup message, if UE is in idle mode, or in a UE Context Modification Request message, if UE is in active mode. The eNode B determines into which RAT or carrier frequency the UE should be moved to and directs the UE to retune to a new cell. In case of a PS handover the eNode B determines, preferably based on UE measurements, which cell the UE should be moved to and handover the UE to the new target cell. If the location area identifier of the new cell differs from the one stored in the mobile device, a location update must be performed before the UE responds to the page to establish the call connection. Correspondingly, for mobile originated calls, the UE makes a service request with the Extended Service Request message for mobile originating CS fallback to the MME. The MME requests the eNode B to perform CSFB for the UE by sending CSFB indicator in an Initial UE Context Setup message, if UE is in idle mode, or in a UE Context Modification Request message, if UE is in active mode. The eNode B redirects or handovers the UE to the GERAN (2G) or UTRAN (3G). To determine the target GERAN or UTRAN cell to which the UE should be moved, the eNode B may either solicit measurements from the UE or use its existing information about preconfigured cells. When the target cell has been identified, the eNode B triggers a cell change to the 2G/3G network by sending a Radio Resource Control (RRC) message to the UE. The UE moves to the new cell and performs a radio resource connection using agreed procedures. In addition, before the call originates, a location update may be necessary if the LAI of the new cell differs from the one stored in the UE.

Figure 1:
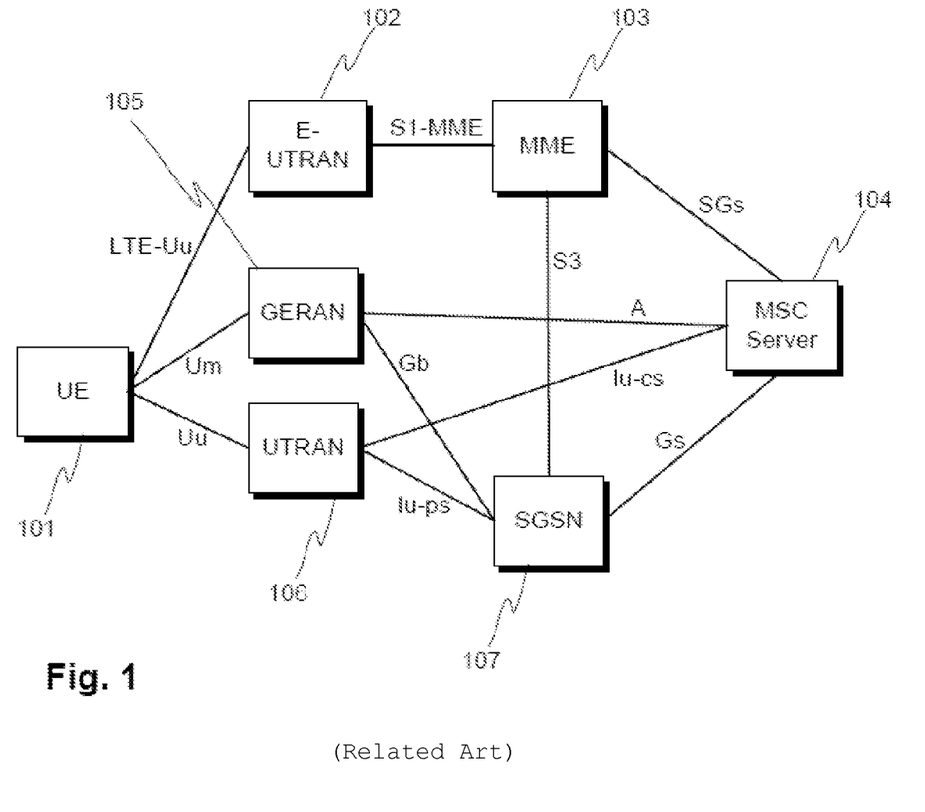
FIG. 1 illustrates the EPS architecture with the necessary elements from the CS based systems.

To better understand the CSFB function FIG. 1 illustrates the EPS architecture with the necessary elements from the CS based systems. UE 101 comprises means for interacting with different communications technologies, such as GSM, WCDMA and LTE. Thus, UE 101 is able to be in connection to GERAN 105 over Um interface. Alternatively or in addition, the UE 101 is able to be in connection to UTRAN 106 over Uu interface. Furthermore, the UE 101 comprises means for being interaction with E-UTRAN 102 over LTE-Uu interface. Both the GERAN 105 and UTRAN 106 are controlled by MSC server 104 over either interface A for GERAN 105 or interface Iu-cs for UTRAN 106. Interface Iu-cs between UTRAN and MSC Servers is especially meant for CS service purposes. Moreover, the E-UTRAN 102 is controlled by MME 103 over S1-MME interface. In order to manage connections and roaming aspects of UEs an interface SGs is configured to enable signaling between MME 103 and MSC 104. Network element SGSN 107 providing support for packet services in GSM and WCDMA systems interacts with MSC server 104 over Gs interface and over Gb interface to GERAN 105 and over Iu-ps interface to UTRAN 106.

In order to manage the CSFB there is a need for EPC system to know if the UE supports CSFB. Thus, when the UE attaches to the EPC system using E-UTRAN it indicates that it supports CSFB if that is the case. The indicator makes the MME node inform the MSC Server that a UE supporting CSFB has attached (using the same technique as SGSNs and MSC Servers use for a combined attach). The MME allocates a LAI, which is configured on the MME and may take into account the current TAI (Tracking Area Identity) that the UE is located in. Typically the MME has a mapping table in which the current TAI points out the LAI to be used, and the current TAI and the LAI in the mapping table has more or less the same geographical coverage. Current TAI means the TAI of the current serving cell in E-UTRAN. In this process the UE becomes registered in the current TA (Tracking Area) in EPS (or in a list of TAs) and in one LA (Location Area) in MSC.

If multiple PLMNs are available for the CS domain, the MME performs selection of the PLMN for CS domain based on selected PLMN information received from the eNode B, current TAI, old LAI and operator selection policies on preferred Radio Access Technology (RAT) for CS domain. The PLMN selected for CS should be the same that is used for this UE as a target PLMN for PS handovers or for any other mobility procedures related to CSFB. The selected PLMN-id is included in the LAI which is sent to MSC/VLR and in Attach Accept to the UE.

In order to maintain the location information up-to-date the UE performs a Tracking Area (TA) update when TA update timer expires or when the UE moves into a TA that it is not registered in EPC connection. At each TA update the UE becomes registered in a TA into which the current EPS cell belongs to (or in a list of TAs). If needed, the UE becomes registered in a new LA in MSC, which registration is performed by MME over the SGs interface. In order to be able to perform necessary registrations the MME needs a mapping table between TAI and LAI to be able to contact the right MSC/VLR (Visitor Location Register) and to judge whether LA update is required at a TA update.

The problem arises at least partly from that the UE is moved to an UTRAN cell, or to GERAN cell when cells that belong to Multiple PLMN identities are introduced in GERAN, in which the UE recognizes another LAI than the one the UE is registered to for the CSFB procedure by as described above. As a result the UE performs a LA update before responding to the paging at mobile terminating call or before performing CS call establishment procedure at a mobile originating call.

The LA update due to different LA is performed when PS handover or RRC CONNECTION RELEASE with redirection indication is used to indicate the need for CSFB to the UE. Since CSFB will approximately double the call setup time compared to normal call setup time due to LA update, it is beneficial to develop such procedures that shorten the CSFB time.

Another aspect is that when the terminal attaches to the EPC system using E-UTRAN it indicates that it supports CSFB, but it does not indicate if it is a supporting UE for UTRAN shared network. In UTRAN, all UEs from a certain version of the technical specifications are supposed to be supporting UEs and the network sharing functionality of understanding multiple PLMNs sent on the broadcast channel is mandatory according to corresponding technical specifications. In reality there exist UEs that do not have the UTRAN shared network functionality activated e.g. a reason that UE vendors do not activate the functionality because a lack of interoperability tests. In GERAN, the network sharing functionality of understanding multiple PLMNs sent on the broadcast channel is optional to support for the UE. Therefore, both the supporting UEs and the non-supporting UEs of the same specification exist in shared networks, but EPC does not know if a UE is supporting or non-supporting terminal. As a result, it does not know if the UE will use common PLMN or one of the multiple PLMNs in a shared UTRAN or GERAN. During the attach procedure the MME allocates a LAI for a UE, which is configured in the MME. When target network for CSFB, e.g. UTRAN, is shared, the MME has to select a PLMN for this LAI, which is either the common PLMN or a multiple PLMN. However, the selection between common PLMN and the multiple PLMN turns out to be impossible, since the MME cannot be sure that the UE is supporting or non-supporting type of UE. In a case, that the MME allocates the common PLMN and sends the Common PLMN identity to a supporting UE, the UE will have a mismatch of LAI in the target shared network, since this UE will not use the common PLMN but a multiple PLMN. Correspondingly, if the MME allocates a multiple PLMN and sends the multiple PLMN identity to a non-supporting UE, the UE will have a mismatch of LAI in the target shared network, since this UE will not use the multiple PLMN but the common PLMN. The term 'a multiple PLMN' refers to one PLMN that is disclosed in the Multiple PLMN ID List broadcast in a location area.

The consequence of both of these alternatives is that the CSFB time is longer due to the required LA update and therefore the call set up time is longer causing dissatisfaction to the user of the terminal.

For in bound roamers with non-supporting UEs and that has roaming agreement with more than one operator, location update may result in that this subscriber is rerouted by RAN to another CN operator than the CN operator whose MSC Server the roamer is registered. The roamer will then be served by another MSC/VLR than the chosen one by the MME. To save the call the network needs to support roaming retry or roaming forwarding for CS fallback between to different CN operators. If roaming retry or roaming forwarding is not supported the CS fallback will fail. The roaming retry takes very long time and is not suitable for CS fallback. Mobile Terminating Roaming Forwarding" procedure and roaming forwarding also adds substantial delay to the CS fallback procedure.

As a summary, it would be advantageous to introduce a solution in which the MME in E-UTRAN is aware of the type of a UE for which it is defining a PLMN during CSFB procedure. This enables the MME to determine the most appropriate PLMN for the UE complying with the allocated LAI.

SUMMARY OF THE INVENTION

An objective of the invention is to present a method and a network element for performing a selection of a public land mobile identity in a shared network environment. Another objective of the invention is that the method and the network element for performing the selection minimizes any delay in a need of a certain type of network service by also optimizing the needed resources in order to provide the service.

The objectives of the invention are achieved by introducing a novel method for taking into account the capability of user equipment when selecting the public land mobile identity in a shared network environment for a service. More precisely, the capability of the user equipment is determined primarily on the basis of information received from the user equipment and the public land mobile network identity is at least partly selected on the basis of the received information. The objectives of the invention are also achieved by a network element implementing the corresponding method steps.

According to a first aspect, a method for performing a selection of a public land mobile network identity in a shared network environment is provided, in which environment at least two public land mobile network identities are available for providing circuit switched based service to a user equipment, and the user equipment is configured to deliver information representing capability of the user equipment to the network. The method comprises at least the following steps: determining, on the basis of information representing the capability of the user equipment, if the user equipment is capable of utilizing information relating to network sharing within system broadcast information; selecting the public land mobile network identity at least partly on the basis of the capability of the user equipment among the at least two public land mobile network identities. The method may comprise a further step of allocating the user equipment to a location area by means of a location area identifier comprising information on the selected public land mobile network identity in order to provide circuit switched based service to the user equipment.

The user equipment may be allocated to location area by means of a location area identifier in a context at least one of the following: combined EPS/IMSI attach, combined tracking and location area update, combined tracking and location area update with IMSI attach.

The step of determining the capability of the user equipment may comprise a step of requesting information on the identity of the user equipment in response to a detection of a lack of capability information from the user equipment. In response to a receipt of information on the identity of the user equipment information on the capability of the user equipment may be inquired from a database on the basis of the received identity of the user equipment. The identity of the user terminal may be based on at least one of the following: Mobile Equipment Identity (IMEI), Type Allocation Code (TAC).

According to the first aspect of the invention a multiple public land mobile network identity may be selected if the determination of the capability of the user equipment indicates that the user equipment is capable of utilizing information relating to network sharing within system broadcast information and a common public land mobile network identity may be selected if the determination of the capability of the user equipment indicates that the user equipment is not capable of utilizing information relating to network sharing within system broadcast information.

The method may further comprise a step of storing at least one of the following in a memory: the capability of the user equipment received from the user equipment, the result of the determination of the capability of the user equipment, information on the selected public land mobile network, the location area identifier, information inquired from the database, a reference indicating the capability of the user equipment. The method may further comprise a step of checking if the memory comprises stored information relating to at least one of the following: the capability of the user equipment received from the user equipment, the result of the determination of the capability of the user equipment, information on the selected public land mobile network, the location area identifier, information inquired from the database, a reference indicating the capability of the user equipment be utilized in a subsequent selection of the public land mobile network identity.

Alternatively or in addition, the capability of the user equipment to support network sharing may be determined on the basis of a previously selected public land mobile network selection indicated in a location area identifier.

The selection of the public land mobile network identity may be configured to be performed in a context of circuit switched fallback.

According to a second aspect, a network element, comprising at least one processor, and at least one memory comprising computer program code to be executed at least partly by the at least one processor causing the network element at least to perform a selection of a public land mobile network identity in a shared network environment is provided, in which environment at least two public land mobile network identities are available for providing circuit switched based service to a user equipment, and the user equipment is configured to deliver information representing capability of the user equipment to the network. In order to select a public land mobile network identity the network element is configured to determine, on the basis of information representing the capability of the user equipment, the capability of the user equipment to utilize information relating to network sharing within system broadcast information, and select the public land mobile network identity at least partly on the basis of the capability of the user equipment among the at least two public land mobile network identities.

The network element may further be configured to allocate the user equipment to a location area by means of a location area identifier comprising information on the selected public land mobile network identity in order to provide circuit switched based service to the user equipment.

The network element may be configured to detect if information on the capability of the user equipment is not received from the user equipment. The network element may be configured to request information on the identity of the user equipment in response to a detection of a lack of capability information from the user equipment. The network element may also be configured to, in response to a receipt of information on the identity of the user equipment, to inquire information on the capability of the user equipment from a database coupled to the network element on the basis of the received identity of the user equipment.

Alternatively or in addition a multiple public land mobile network identity may be selected if the determination of the capability of the user equipment indicates that the user equipment is capable of utilizing information relating to network sharing within system broadcast information and a common public land mobile network identity may be selected if the determination of the capability of the user equipment indicates that the user equipment is not capable of utilizing information relating to network sharing within system broadcast information.

The exemplary embodiments of the invention presented in this patent application are not to be interpreted to pose limitations to the applicability of the appended claims. The verb "to comprise" is used in this patent application as an open limitation that does not exclude the existence of also unrecited features. The features recited in depending claims are mutually freely combinable unless otherwise explicitly stated.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE INVENTION AND ITS ADVANTAGEOUS EMBODIMENTS

Now the invention is described in detail by referring to some advantageous embodiments of the inventive idea. The method according to the invention relates to performing a selection of a public land mobile network identity (PLMN-id) in a shared network environment, in which environment at least two public land mobile network identities are available. Typically the public land mobile networks in a shared network environment are offered by separate telecom operators who are sharing at least part of the network and/or network elements. Especially, the method according to the invention is configured to select a PLMN identity in a shared network environment in order to offer circuit switched service, when user equipment (UE) needs such a service. For example, a circuit switched fallback situation is such a case, when the UE coupled to EPS, e.g. LTE network, needs to be re-directed into such a network that can provide CS services.

Figure 2:
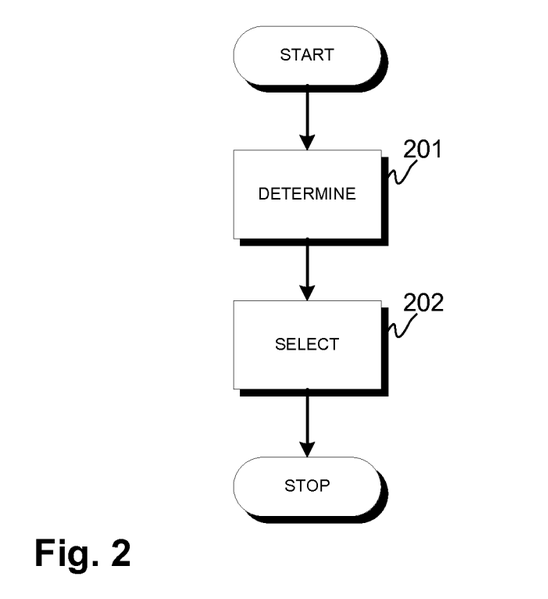
FIG. 2 illustrates at least part of the method steps according to an embodiment of the invention.

The method according to the invention is described by referring to FIG. 2 illustrating at least part of the method steps of the invention. The selection of the PLMN identity in a shared network environment is based at least partly, according to the invention, to the capability of the UE to support network sharing. More specifically, when selecting the PLMN identity it is determined 201 if the UE is a supporting or non-supporting UE i.e. capable of utilizing the broadcast system information in a shared network environment or not for PLMN identity selection. Based on the determination an appropriate PLMN identity is selected 202 in order to minimize any further need to change the PLMN e.g. when an inappropriate PLMN is recognized in a context of CSFB, which initiates the location area update causing the CSFB time to be too long. Thus, it is important to know if the UE is supporting or non-supporting type of UE and thus, if a common PLMN identity or multiple PLMN identity can be selected.

The capability of UE may be dependent on the radio access technology (RAT). More specifically, the UE may support network sharing in a first RAT, such as UTRAN, but may not support network sharing in a second RAT, such as GERAN, or vice versa. Furthermore, in case of even more RATs it may happen that the UE supports network sharing in only part of the available RATs. Naturally, it is possible that the UE is capable of supporting network sharing in all or none of the RATs available. The selection of the PLMN identity depends on the intended RAT that the PLMN is selected for. For example, when selecting the PLMN identity for UTRAN it is determined 201 if the UE is a supporting or non-supporting UE for UTRAN network sharing, and when selecting the PLMN identity for GERAN it is determined 201 if the UE is a supporting or non-supporting UE for GERAN network sharing. Thus, it is important to know if the UE is a supporting or non-supporting type of UE for each RAT and thus, if a common PLMN identity or multiple PLMN identity can be selected for a certain RAT or not.

The determination of the capability of the UE is performed by analyzing capability indication received directly from the user equipment or indirectly from the user equipment via the radio node, e.g. eNode B. More specifically, the UE may comprise information, stored in a memory element of the UE, by means of which it is possible to determine if the UE is supporting or non-supporting type of UE for all or a certain RATs. According to an embodiment of the invention the stored information directly indicates if the UE is supporting or not for all or a certain RATs. This information may be delivered to the network in order to select a PLMN according to the capability of the UE. According to some other embodiment the stored information does not directly indicate the capability of the UE, but the capability information can be derived from it either in the UE or in the network. The UE may comprise application software installed in order to retrieve the information from the memory element and based on the retrieved information capable of deriving the capability information of supporting or not the network sharing from the stored information, when the application software is executed by a processing unit of the UE. The information on the UE capability is delivered to the network in order to indicate in EPS, e.g. LTE network also called E-UTRAN that the UE in question is capable of supporting network sharing information broadcast or the UE in question it is not capable of supporting network sharing information broadcast for all or a certain RAT.

Furthermore, the UE may inform that it is a supporting UE or a non-supporting UE for at least some RATs directly to the EPC in NAS (Non-Access Stratum) protocol level. This indication may be at least one UE capability bit in ATTACH REQUEST message. The indication may be included directly in this message, or it may be included in UE network capability information element or in MS network capability information element, which are contained in ATTACH REQUEST message. In addition to sending the indication in ATTACH REQUEST message the UE may also be enabled to send the indication in TRACKING AREA UPDATE REQUEST message. Similar to ATTACH REQUEST message, the indication may be included directly in TRACKING AREA UPDATE REQUEST message or it may be included in UE network capability information element or in UE network capability information element which are contained in TRACKING AREA UPDATE REQUEST message.

Alternatively, the UE may deliver the indication that it is a supporting or non-supporting UE for at least some RATs to the radio node (eNode B) in AS (Access Stratum) and the EPC may thus receive or inquire the indication from the radio node (eNode B). At AS implementation, the UE may be configured to deliver the indication to the radio node (eNode B) through the Radio Resource Control (RRC) protocol. The EPC may, for example, receive the information in S1 AP message INITIAL UE MESSAGE for providing the indication in relation to an Attach procedure or in S1 AP message UPLINK NAS TRANSPORT for providing the indication at tracking area update procedure. The UE may send the indication to the radio node as a UE radio capability or as a feature group indicator in RRC protocol. Instead of receiving the capability indication the network may be designed to request the capability indication information.

In addition to the above described method of receiving an indication of the UE capability either directly or indirectly from the UE, a database may be arranged to secure that the information on the capability of the UE is available in the network. If the network element communicating with the UE does not receive the indication of the capability from the UE, it may initiate the determination of the capability of the UE by inquiring information relating to the capability of the UE from the database. In the database it is maintained information relating to UEs. For example, the database may comprise information on the International Mobile Equipment Identities (IMEI) which are supporting type of UEs for all or a certain RAT. Alternatively or in addition, the database may comprise a list of IMEIs, which are non-supporting type of UEs for all or a certain RAT. It is enough if the database comprises information to such extent that it can be decided if a UE is supporting or non-supporting type of UE for all or a certain RAT, when such information is inquired from the database. The IMEI is composed on the following elements: Type Allocation Code (TAC), Serial Number (SNR) and spare digit. At least the TAC is important to be stored in the database since TAC defines the UE model type, which is enough for determining if the UE is supporting or non-supporting type of UE for all or a certain RAT. Thus, the database may comprise only the TAC for each UEs existing in the market in some embodiments of the invention. Thus, it is enough for the network element that it receives the IMEI code, or any other mentioned information from the UE, in order to retrieve information on the capability of the UE from the database. According to an embodiment it may be configured so that the network element is configured to detect if UE has indicated its capability to support or not support the shared network information in the broadcast message as described. If such information is not received from the UE, the network element may be configured to initiate requesting information on the identity of the UE. This can be achieved by e.g. delivering an Identity request to the UE by the network element, such as MME. In response to the Identity request the UE delivers its identity, such as IMEI code, to the requesting network element over the radio access network. By means of the received UE identity, the network element is capable of determining the UE capability for all or a certain RAT from a database.

In some cases it may turn out that the network element is not capable of utilizing the received information from the UE relating to the capability of the UE. In such a case the network element may be configured to initiate requesting information on the identity of the UE similarly as described above. For example, an Identity request message may be delivered to the UE by the network element, such as MME. In response to the Identity request message the UE delivers its identity, such as IMEI code, to the requesting network element over the radio access network. By means of the received UE identity, the network element is capable of determining the UE capability for all or a certain RAT from a database.

The method according to some embodiments of the invention may further comprise a step of storing at least one of the following in a memory of a network element: the capability of the user equipment received from the user equipment, the result of the determination of the capability of the user equipment as described above, information on the selected public land mobile network, the location area identifier, information inquired from the database, a reference indicating the capability of the user equipment.

Figure 3:
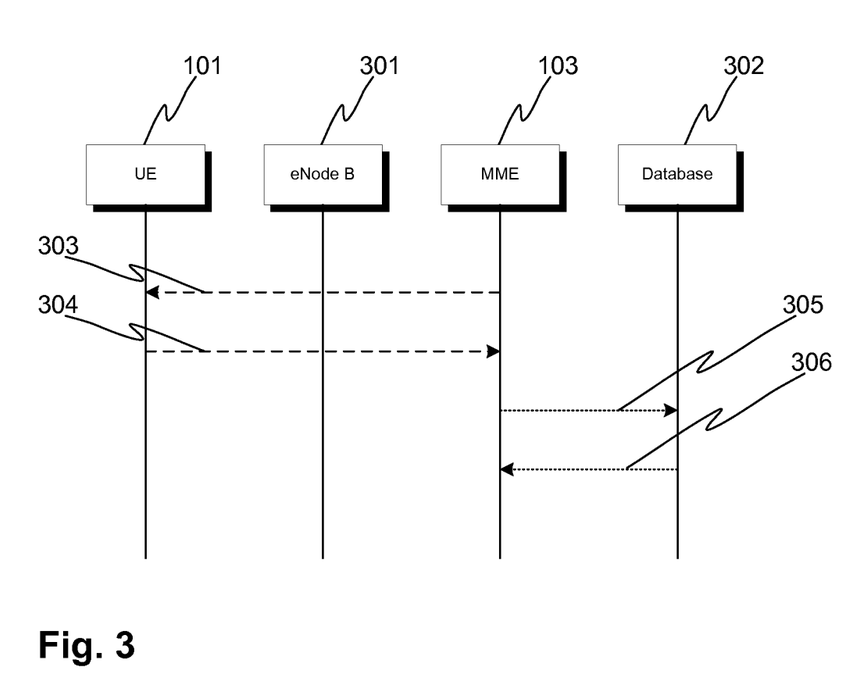
FIG. 3 illustrates at least part of the signaling according to an embodiment of the invention of acquiring information of the capability of a UE.

FIG. 3 illustrates an embodiment of the invention of acquiring information on the capability of a UE 101 from a database 302 in case it is detected by the network element that the UE has not delivered its capability information to the network element. A network element 103, such as MME, is configured to acquire information on the UE by delivering an Identity Request 303 to the UE 101, which is e.g. accessing to the network, in order to define some security related issues relating to the UE. The UE is equipped with a ME identity and is configured to inform its identity in a response signaling 304 to the network element 103. The signaling between the network element 103 and the UE 101 is performed over radio access network, which in EPS case comprises e.g. eNode Bs 301. In response to the response message 304 comprising the identity of the UE 101 the network element 103 is configured to deliver Mobile Equipment (ME) identity request 305 comprising information relating to the UE 101 to the database 302. In other words, information is inquired from a database if the user equipment is capable of supporting network sharing information broadcast or not. The information relating to the UE 101 may comprise an IMEI of the UE 101 or TAC of the UE 101, for example. The database 302 is configured to compare the information relating to the UE 101 to stored information in the database 302 and based on the comparison deliver a response message 306 comprising a response to the request to the network element 103.

Next, a more specific example of an embodiment of the invention is described relating to the determination of the capability of the UE 101 by utilizing a database in case that the UE 101 has not delivered its capability information to the network element. The determination of the capability of the UE 101 is according to an embodiment of the invention performed in such a manner that the network element 103 inquiring the capability of the UE 101 from the database 302 delivers 305 a TAC to the database 302. The delivered TAC is compared to stored TACs in the database 302. If the delivered TAC matches with a TAC indicating the supporting type of UE 101, the database 302 delivers a positive response 306 to the network element 103. The response can be indicated with one bit in a response message, for example. Based on the positive response the network element 103 can select an appropriate PLMN for the 101 UE and deliver information on the selected PLMN-id to the UE 101. According to another embodiment of the invention the network element 103 may deliver an IMEI of the UE 101 to the database 302. The database 302 compares the IMEI with the stored IMEIs and gives a response similarly as described above. According to still some other embodiment the database 302 may be capable of determining the TAC from the delivered IMEI and compare the TAC with the stored TACs in the database 302. According to still some further embodiment the database 302 may give a negative response to the network element 103, which is capable of determining that the UE is non-supporting type in that case. The positive and negative responses as described above are examples and they may be used for opposite meanings. Moreover, it is possible to arrange that the database 302 comprises information on supporting type of UEs or non-supporting type of UE or both of these. The response is also possible to give in any such a manner that the network element 103 is able to define the meaning of the response on its own in order to find out if the UE 101 is supporting or non-supporting UE. Based on the meaning of the response the network element 103 can select an appropriate PLMN for the 101 UE and deliver information on the selected PLMN-id to the UE 101.

According to some embodiment of the invention the database may be configured to request information relating to a delivered TAC or IMEI in ME Identity request from another network element or network, such as from Internet. This can advantageously happen if the database does not comprise information matching with the delivered TAC or IMEI in the Mobile Equipment Identity request. The database is configured to find information revealing the capability of the requested UE to support or not support the shared network information delivered in the broadcast system information in a network.

According to an embodiment of the invention, when the PLMN-id is selected, the UE is allocated to a location area by means of a location area identifier comprising information on the selected public land mobile network to provide circuit switched based service to the user equipment. More precisely, a network element allocates the UE either to a common PLMN or a multiple PLMN for all or a certain RAT according to the capability of the UE for all or a certain RAT. The UE is allocated to a common PLMN if the UE is non-supporting UE. Correspondingly, the UE is allocated to a multiple PLMN if the UE is supporting UE.

According to an embodiment of the invention the UE is allocated to a location area by means of a location area identifier in some specific contexts and/or occasions. The UE can be allocated at least, when the UE is performing so called combined attach to a network. This means that the UE is attaching both to the EPC and to the CS domain and it is known as combined EPS/IMSI attach. Additionally, the allocation is configured to be performed in a combined tracking and location area update which means that the update procedure is performed when it is noticed that the UE is moved to other location area than the one the UE previously was registered to. Furthermore, the allocation of the UE to a LAI is configured to be performed in a context of a combined tracking and location area update with IMSI attach i.e. when a UE that is attached for EPS services wants to perform an attach for non-EPS services, such as CS services.

In order to optimize the signaling traffic in a network the network element managing the PLMN selection for CS purposes in a shared network environment may store the result relating to the capability of the UE received from the UE or inquired from a database in a memory. This enables the utilization of the result in any subsequent instances when the network element needs to know the capability of the UE to support the network sharing in a sense that the UE is capable of selecting the PLMN operator as the serving operator for CS needs. The piece of information to be stored in a memory of the network element can be the result of the determination of the capability of the user equipment. Alternatively, the stored piece of information can be a location area identifier (LAI) the UE is allocated to or an identity of the selected PLMN. Furthermore, the stored piece of information can be any other reference indicating the selected PLMN or LAI for the UE. Some embodiment of the invention discloses an alternative that an IMEI or TAC representing the UE identity or any other reference indicating the capability of the user equipment may be stored in the memory of the network element.

The stored piece of information in the memory of the network element can be utilized in e.g. combined tracking area and location area update. Advantageously it is checked if the memory comprises stored information relating to the selection of the public land mobile network or location area identity. If the memory comprises stored information relating to the result of the determination of the capability of the user equipment, information on the selected public land mobile network, the location area identifier or information inquired from the database in general, it is utilized in subsequent selection of the public land mobile network identity for allocation of location area identity accordingly. The subsequent selection can be a consequence of tracking and location area update, for example.

According to an embodiment of the invention the public land mobile network identity is selected according to previously selected public land mobile network selection indicated in a location area identifier. The previously selected public land mobile can be the PLMN, which was defined in the previous CS fallback procedure if the UE has a LAI, or the PLMN in a LAI that was allocated to the UE while accessing the shared (UTRA) network. This can be implemented, for example, in such a way that the UE, when entering to E-UTRAN, delivers information on the old LAI into which the UE was allocated to in the previous attach, location updates or combined tracking and location area update. More specifically, before making a ME identity request and check, the network element is configured to check if the UE already has an old LAI. If the old LAI contains a Common PLMN the network element allocates the UE to a new LAI of a Common PLMN and sends this LAI to the UE in order to make the UE to register to the LAI. Alternatively, if the old LAI contains a Multiple PLMN the network element allocates the UE to a new LAI of a Multiple PLMN and sends this LAI to the UE in order to make the UE registered to the LAI. If there is no any type of old LAI existing, the network element is configured to determine the capability of the UE.

The network element analyzing capability indication received from the user equipment or from a database may perform a ME identity request if ME identity is not already available in the network element, and finally check against a data base if UE is a supporting or a non-supporting UE. Based on the outcome of the determined capability the network element is configured to determine an appropriate PLMN for the UE and thus allocate the UE to an appropriate LAI.

According to some embodiment of the invention the network element is configured to check the old LAI at attach or at combined tracking area and location area update.

The invention also relates to a network element, which is configured to manage at least partly the signaling and communication of the UE in a network. The network element can be responsible for UE tracking and paging procedures including retransmissions. It can be involved in the bearer activation/deactivation process and be in responsible for managing the initial attachment to a network. It can participate to authentication procedures of the user and to termination of signaling and UE identity management issues. The network element can be configured to provide control functions for mobility between LTE and 2G/3G access networks when needed.

Figure 4:
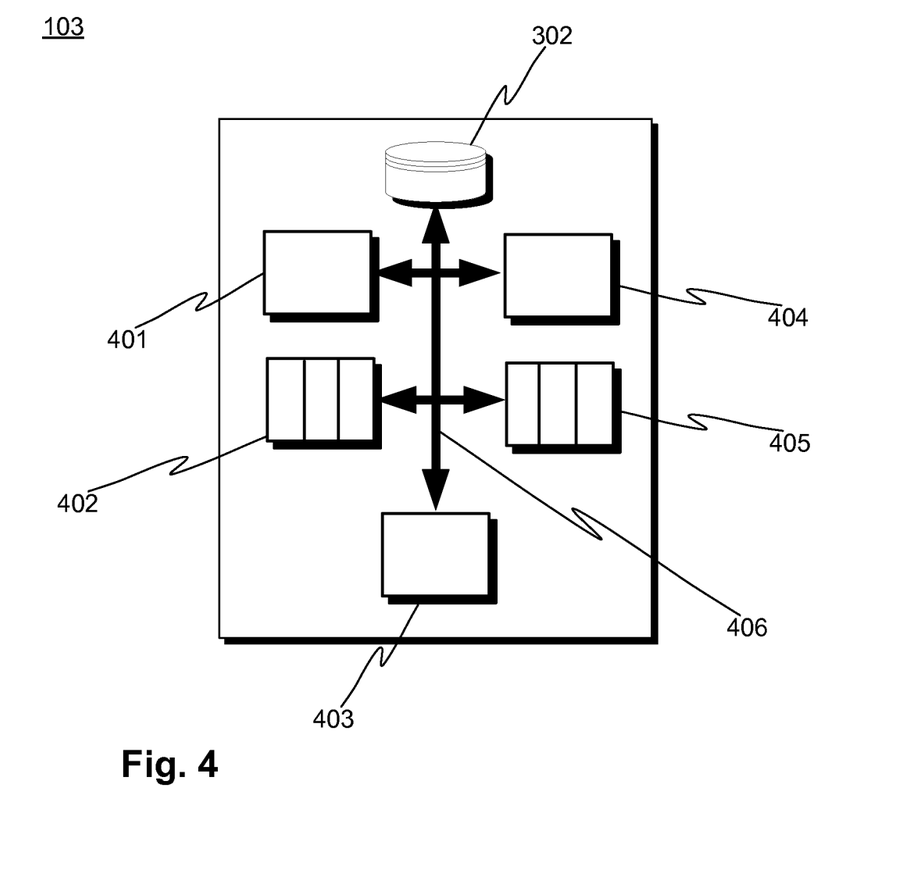
FIG. 4 illustrates a network element according to an embodiment of the invention.

FIG. 4 illustrates an example of a network element 103, such as an MME, that comprises at least one processor unit 401 suitable for implementing one or more embodiments disclosed herein. In addition to the processor unit 401 (or Central Processor Unit; CPU) i.e. one or more processor(s), the network element may comprise network connectivity elements 402, random access memory (RAM) 403, read only memory (ROM) 404 and input/output (I/O) devices 405. The network element 103 may further comprise a database 302 for storing at least part of information relating to the UEs utilizing the resources of a telecommunication network. These components may communicate with one another via a bus 406. In some cases, at least some of these components can locate in a single physical entity or in more than one physical entity.

The processor unit 401 is configured to execute instructions, computer programs or scripts, which can be accessed via network connectivity elements 402, or from RAM 403 or ROM 404. While only one processor is disclosed in FIG. 4, multiple processors may be present.

The network connectivity elements 402 may comprise any means for implementing wired and/or wireless connectivity of the network element 103, such as modems, Ethernet devices, universal serial bus (USB) interface devices, wireless local area (WLAN) devices, radio transceiver devices, such as GSM radio transceiver devices, WCDMA radio transceiver devices and/or LTE radio transceiver devices. The network connectivity elements enable at least the network element to communicate with the corresponding external telecommunication networks or Internet or other networks or any other external network element over preconfigured interfaces.

The RAM 403 can be used to store volatile data and instructions that are executed by the processor. The ROM 404 is a non-volatile memory and it is used to store instructions and perhaps data that are read during the execution of instructions.

The I/O devices 405 may include displays, touch screen displays, keyboards, keypads, switches, mice, track balls, voice recognizers, card readers, or other known I/O devices.

The database 302 may be implemented in the network element 103 or coupled to it through the network connectivity elements 402. The database 302 comprises at least part of the information relating to the UEs necessary for implementing the method according to the invention. Thus, the database 302 comprises at least partly information on the capability of a UE to support broadcast system information in a shared network environment. The database 302 can be a separate memory element or it can be implemented in RAM 403 or ROM 404 of the network element 103.

According to an embodiment of the invention the network element 103 comprises software stored in the memory elements and executed by the processor unit to acquire information on the capability of the UE by reception of the information from the UE or requesting the information from the UE. The processor unit when executing the software is configured to detect if a UE has delivered the capability information. According to an embodiment of the invention if the network element detects that no capability information is received, it may request the information from the UE or alternatively it may request the information on the identity of the UE in order to request the capability information from a database as described. Furthermore, it may turn out that the network element is not capable of utilizing the received information from the UE. In such a case the network element may be configured to initiate requesting information on the identity of the UE. This can be achieved by e.g. delivering an Identity request message to the UE by the network element, such as MME. In response to the Identity request the UE delivers its identity, such as IMEI code, to the requesting network element over the radio access network. By means of the received UE identity, the network element is capable of determining the UE capability from a database.

According to an embodiment of the invention the network element 103 comprises software stored in the memory elements and executed by the processor unit to acquire information on the UE by delivering an Identity Request to the UE 101, which is e.g. accessing to the network. The processor when executing the software is configured to analyze the received response signaling from the UE and determine the identity of the UE. The network element 103 when executing the stored software by means of a processor is configured to deliver Mobile Equipment (ME) identity request comprising information relating to a UE to the database 302. The information relating to the UE 101 may comprise an IMEI of the UE 101 or TAC of the UE 101, for example. In case, the database is implemented in the network element 103, the network element 103 is configured to compare the information relating to the UE 101 to stored information in the database 302 and based on the comparison to deliver a response message indicating the capability of the UE i.e. indicating if the UE is supporting or non-supporting type of UE. When the network element has received the information representing the capability of the user equipment 101, the network element may determine, on the basis of received information representing the capability of the user equipment 101), the capability of the user equipment 101 to utilize information relating to network sharing within system broadcast information. Based at least partly on the capability of the user equipment 101 the network element may select a public land mobile network identity among the at least two public land mobile network identities in a shared network. The network element may be configured to deliver information on the selected PLMN-id to the UE 101 by means of appropriate signaling. Moreover, the network element according to the invention is configured to implement any and all of the method steps described in a context of the method description above.

According to an embodiment of the invention the network element is MME. According to another embodiment the method steps are implemented at least partly in the MME, but some steps may be configured to be implemented in some other elements in the network, such as in a eNode B in RAN.

The invention also relates to a telecommunication system comprising a packet switched network and a shared network, in which at least two public land mobile network identities are available for providing circuit switched based service to user equipment. The at least two public land mobile network identities can indicate different telecom operators, for example. The packet switched network and the shared network are configured to interwork with each other. The system and especially the packet switched network is configured to, for selecting a public land mobile network identity, determine a capability of the user equipment residing in an area served by the telecommunication system, and select the public land mobile network identity among the at least two public land mobile network identities at least partly on the basis of the capability of the user equipment. Furthermore, the packet switched network in the system is configured to allocate the user equipment to a location area by means of a location area identifier comprising information on the selected public land mobile network identity in order to provide circuit switched based service to the user equipment within the shared network. Moreover, the system is capable of implementing all the method steps according to the invention and described above. Thus, the system comprises any and all of the elements described earlier in order to be capable of implementing the method steps according to the invention. For example, the system may comprise a database, which maintains the information on the capability of a user equipment to support broadcast system information in a shared network environment, and within the system the determination of the capability of the user equipment is performed by reception of a UE indication or by inquiring information from a database. Alternatively or in addition, it may have been implemented in the system a method for detecting if the network element has received the capability information from the UE. If this is not the case, the network element in the system may request for an identity of the UE from the UE and on the basis of the identity information, request information on the capability of the UE from the database. Moreover, the system comprises any necessary network element in order to implement any method steps according to the invention in order to select an appropriate public land mobile network identity for user equipment residing in the system.

In general, the above described method, network element and system is primarily targeted to be implemented in a context of circuit switched fallback in order to provide satisfactory CS services to subscribers. The method may also be applicable in some other instances in a telecommunication network. Especially, the utilization of the information stored in the database relating to the capability of the UE can be utilized in a similar manner also in other context. For example, according to some embodiments the information relating to the capability of the user equipment may be utilized if the UE is to be transferred from the packet switched network to another packet switched network.

According to some embodiment of the invention the capability information relating to the UE may comprise information if the UE supports so called Single Radio Voice Call Continuity (SR-VCC). The SR-VCC provides the ability to transit a voice call from VoIP/IMS packet domain to the legacy circuit domain, and thus it is important for a network element, such as a MME, to know if UE is capable of SR-VCC based transition. The UE indicates it supports SR-VCC on a NAS (Network Access Server) level, but the UEs AS (Access Stratum) capabilities (indicated by the EUTRA FGI bit 9 to GERAN and FGI bit 27 to UTRAN) may not match the supported SR-VCC of the network if the network only support SR-VCC from EUTRAN to GERAN or from EUTRAN to UTRAN. If the UE only supports e.g. SR-VCC to Radio Access Technology of a first type (RAT-1) while the MME knows by configuration that the network only supports SR-VCC to Radio Access Technology of a second type (RAT-2), the MME should indicate to the UE that voice should be supported in CS domain. Therefore, the MME (and SGSN) needs accurate information on whether the UE supports SR-VCC to GERAN, UTRAN or both in order to decide whether to indicate "VoIMS possible" or "VoIMS not supported" (VoIMS; Voice over IP Multimedia Subsystem) in the Attach/TAU/RAU accept messages. This will allow the UE to use this indication for deciding whether e.g. to use VoIMS, or to initiate a combined attach for CSFB, or to move to 2G/3G only mode (when CSFB is not available and UE is in "voice centric" mode). To resolve the UE the issue and find out the UE capability, the MME checks towards a database if the UE supports SR-VCC to UTRAN, or the MME checks towards the database if the UE supports SR-VCC to GERAN. Thus in this case the database is configured with information of whether the UE supports SR-VCC to UTRAN or GERAN. The MME could send the ME identity, IMEI or TAC as described, possibly together with a RAT indication, to the database and the database responds with support or a non-support indication. Based on the response of the UE SR-VCC capability the MME decide whether to indicate "VoIMS possible" or "VoIMS not supported" in the Attach/TAU/RAU accept messages. If the UE and the network have same SR-VCC capability, the MME selects "VoIMS possible". Otherwise the MME selects "VoIMS not supported".

Yet another example is a packet switched handover, SR-VCC or CS handover to a target network that is shared and broadcasts both a common public land mobile network identity and at least one multiple public land mobile network identity. In these cases the source radio node (eNode B, RNC or BSC) shall select serving public land mobile network identity in the target shared network and indicate the selected serving public land mobile network identity to a target radio node. The radio node of EUTRAN or GERAN does not know if the UE is supporting or non-supporting UE of network sharing in UTRAN, and a radio node of non-shared UTRAN does not know if the UE is supporting or non-supporting UE. In these cases the source radio node does not know whether to select the common public land mobile network identity or one of the multiple public land mobile network identities for the target network, similarly to the circuit switched fallback issue described above. The method described herein can be used for this case as follows. The MME, MSC or SGSN determines the capability of the UE, i.e. whether the UE is supporting or non-supporting UE of shared network. The determination is performed by analyzing the capability indication received from the user equipment, or the network element checks towards a database whether the UE is supporting or non-supporting UE of shared network. As a further option it is possible to detect if the network element has not received the capability information from the UE and in response to the lack of information the network element may request the identity of the UE from the UE and in response to a receipt of the identity information, requesting the capability information from the database. The MME, MSC or SGSN is configured to send an indication to the radio node of the result of the determination of the UE capability or the core network node can insert the capability of correct serving public land mobile network identity before forwarding the handover message to the target core network node. Alternatively, the radio node directly checks the UE capability itself either towards the database or by receiving of an indication from the UE directly. The radio node then selects a common public land mobile network identity if non-supporting UE and one of the multiple public land mobile network identities if supporting UE as serving public land mobile network identity in the target shared network. This solution helps the target network to understand directly under the handover procedure which is the correct serving public land mobile network identity for the UE. As a result, network signaling can be reduced.

The term user equipment (UE) shall be understood as covering any terminal device, which is capable of interacting with one or more networks and/or network elements in order to enable wireless communication. Such terminals are for example mobile stations (MS), mobile phones, wireless modems, tablet computers, laptops.

While several embodiments have been provided in the present disclosure, it should be understood that the disclosed methods, elements and systems may be embodied in many other specific forms without departing from the spirit or scope of the present disclosure. The present examples are to be considered as illustrative and not restrictive, and the intention is not to be limited to the details given herein. For example, techniques, systems, subsystems, elements and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

The invention claimed is:

1. A method for performing, in a circuit-switched fallback procedure from a packet switched domain to a circuit switched domain, a selection of a public land mobile network identity in a shared network environment by a network element, in which environment at least two public land mobile network identities are available for providing circuit switched based service to a user equipment, the method comprising:
receiving, from the user equipment, information representing a capability of the user equipment;
determining, based on received information representing the capability of the user equipment, when the user equipment is capable of utilizing information relating to network sharing within system broadcast information; and
selecting the public land mobile network identity at least partly based on the capability of the user equipment among the at least two public land mobile network identities,
wherein at least the selecting the public land mobile network identity occurs in the circuit-switched fallback procedure from the packet switched domain to the circuit switched domain.

2. The method as claimed in claim 1, further comprising:
allocating the user equipment to a location area by a location area identifier comprising information on the selected public land mobile network identity in order to provide circuit switched based service to the user equipment.

3. The method as claimed in claim 2, wherein the user equipment is allocated to location area by means of a location area identifier in a context at least one of the following: combined EPS/IMSI attach, combined tracking and location area update, combined tracking and location area update with IMSI attach.

4. The method as claimed in claim 1, wherein the determination of the capability of the user equipment comprises requesting information on the identity of the user equipment in response to a detection of a lack of capability information from the user equipment.

5. The method as claimed in claim 4, wherein in response to a receipt of information on the identity of the user equipment inquiring information on the capability of the user equipment from a database on the basis of the received identity of the user equipment.

6. The method as claimed in claim 4, wherein the identity of the user terminal is based on at least one of the following: Mobile Equipment Identity (IMEI) and Type Allocation Code (TAC).

7. The method as claimed in claim 1, wherein a multiple public land mobile network identity is selected when the determination of the capability of the user equipment indicates that the user equipment is capable of utilizing information relating to network sharing within system broadcast information and that a common public land mobile network identity is selected when the determination of the capability of the user equipment indicates that the user equipment is not capable of utilizing information relating to network sharing within system broadcast information.

8. The method as claimed in claim 1, further comprising at least one of the following in a memory: the capability of the user equipment received from the user equipment, the result of the determination of the capability of the user equipment, information on the selected public land mobile network, the location area identifier, information inquired from the database, and a reference indicating the capability of the user equipment.

9. The method as claimed in claim 8, further comprising checking when the memory comprises stored information relating to at least one of the following: the capability of the user equipment received from the user equipment, the result of the determination of the capability of the user equipment, information on the selected public land mobile network, the location area identifier, information inquired from the database, and a reference indicating the capability of the user equipment be utilized in a subsequent selection of the public land mobile network identity.

10. The method as claimed in claim 1, wherein the capability of the user equipment to support network sharing is determined based on a previously-selected public land mobile network selection indicated in a location area identifier.

11. A network element, comprising:
at least one processor, and
at least one memory comprising computer program code to be executed at least partly by the at least one processor causing the network element at least to perform, in a circuit-switched fallback procedure from a packet switched domain to a circuit switched domain, a selection of a public land mobile network identity in a shared network environment, in which environment at least two public land mobile network identities are available for providing circuit switched based service to a user equipment, and for selecting a public land mobile network identity, the network element is configured to
receive, from the user equipment, information representing a capability of the user equipment,
determine, on the basis of received information representing the capability of the user equipment, the capability of the user equipment to utilize information relating to network sharing within system broadcast information, and
select the public land mobile network identity at least partly on the basis of the capability of the user equipment among the at least two public land mobile network identities.

12. The network element as claimed in claim 11, wherein the network element is further configured to allocate the user equipment to a location area by means of a location area identifier comprising information on the selected public land mobile network identity in order to provide circuit switched based service to the user equipment.

13. The network element as claimed in claim 11, wherein the network element is configured to detect when information on the capability of the user equipment is not received from the user equipment.

14. The network element as claimed in claim 13, wherein the network element is configured to request information on the identity of the user equipment in response to a detection of a lack of capability information from the user equipment.

15. The network element as claimed in claim 14, wherein the network element is configured to, in response to a receipt of information on the identity of the user equipment, to inquire information on the capability of the user equipment from a database coupled to the network element on the basis of the received identity of the user equipment.

16. The network element as claimed in claim 11, wherein a multiple public land mobile network identity is selected when the determination of the capability of the user equipment indicates that the user equipment is capable of utilizing information relating to network sharing within system broadcast information and in that a common public land mobile network identity is selected when the determination of the capability of the user equipment indicates that the user equipment is not capable of utilizing information relating to network sharing within system broadcast information.

* * * * *